Sept. 24, 1963    S. FOGLIA    3,105,034
DEVICES FOR REMOVING FISSIONABLE MATERIAL
RODS FROM NUCLEAR REACTORS
Filed April 6, 1960    7 Sheets-Sheet 1

INVENTOR
SEBASTIEN FOGLIA
BY *[signature]*
Agt.

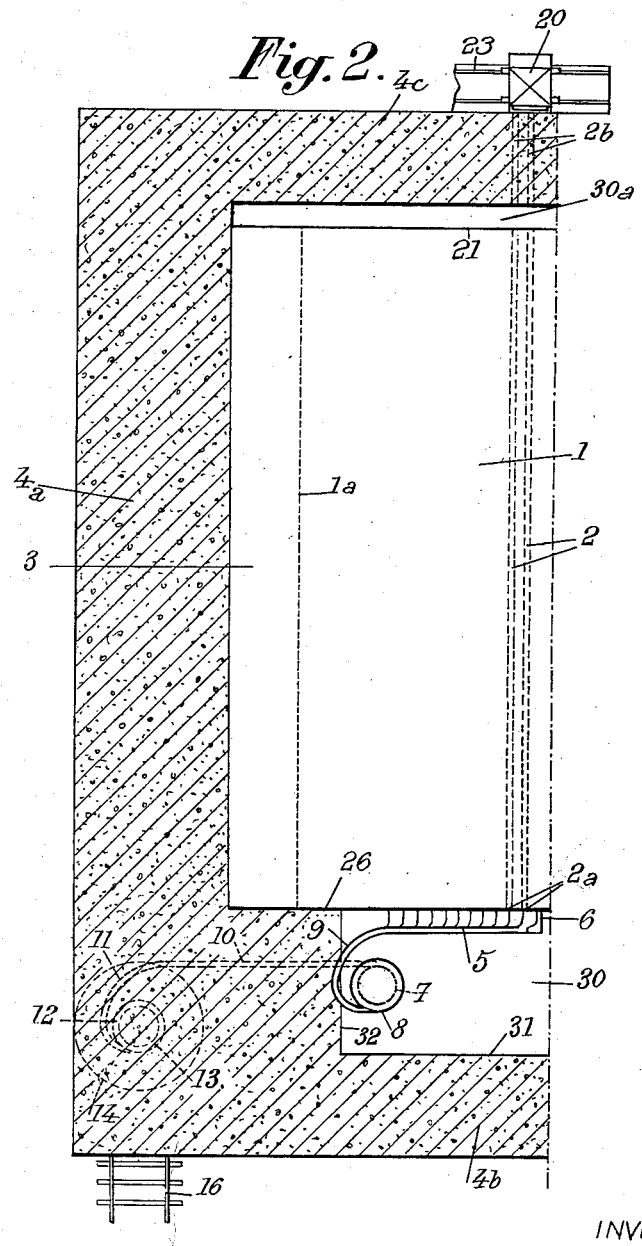

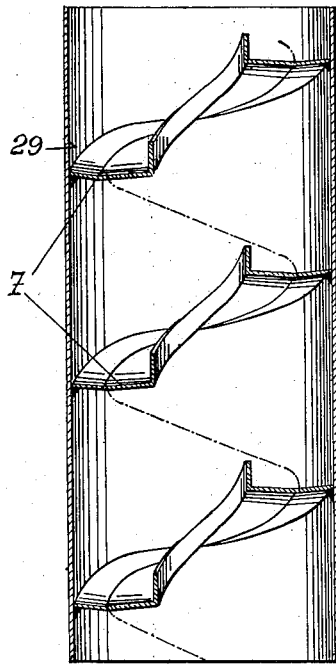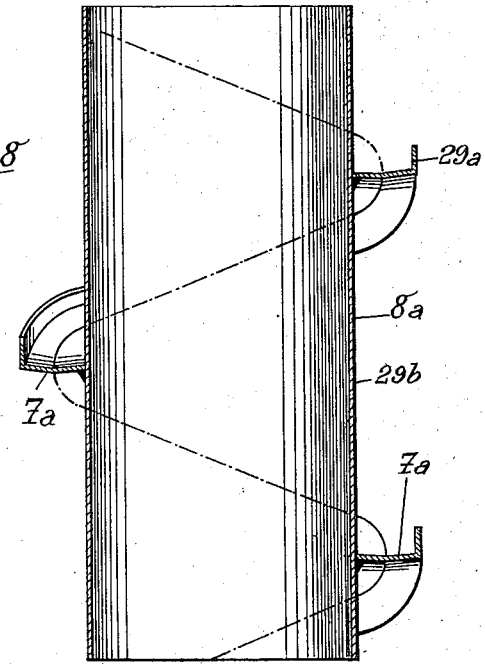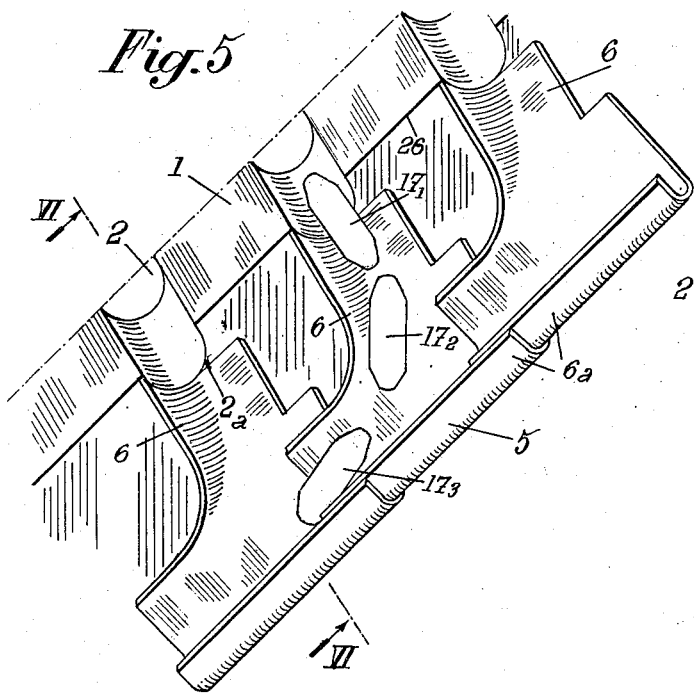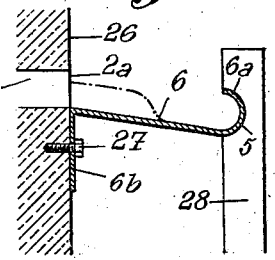
INVENTOR
SEBASTIEN FOGLIA

INVENTOR
SEBASTIEN FOGLIA

INVENTOR
SEBASTIEN FOGLIA

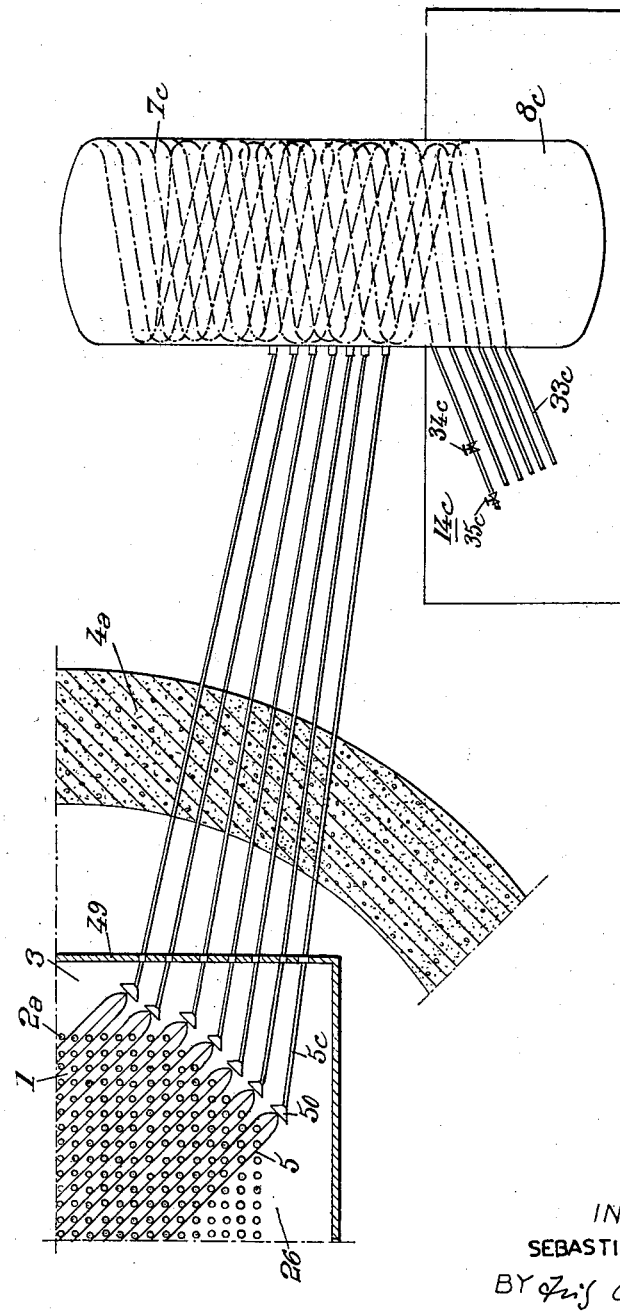

United States Patent Office 3,105,034
Patented Sept. 24, 1963

3,105,034
DEVICES FOR REMOVING FISSIONABLE MATERIAL RODS FROM NUCLEAR REACTORS
Sebastien Foglia, Verrieres-le-Buisson, France, assignor to Commissariat a l'Energie Atomique, Paris, France
Filed Apr. 6, 1960, Ser. No. 20,395
Claims priority, application France June 30, 1955
3 Claims. (Cl. 204—193.2)

The present invention relates to gas-cooled, solid-moderated nuclear reactors and more particularly to the unloading, from such reactors, of the fuel elements constituted by slugs or rods of fissionable material.

The gas-cooled, solid-moderated nuclear reactors comprise in a shield, a block of solid moderator (e.g. in graphite) pierced by a plurality of parallel channels (often about one thousand channels) in which are housed the slugs or rods of fissionable material (e.g. natural uranium), said slugs or rods being surrounded by a jacket or can (e.g. made in an aluminum alloy). The coolant gas is circulated through said channels in order to carry away the heat developed in the fissionable material by nuclear fissions during the operation of the reactor, the jackets having for an object to isolate the fissionable material (and the fission products resulting from the fissions) from the surrounding coolant gas.

After a given period (e.g. a few months) of residence in the reactor, the "spent" nuclear fuel has to be removed, generally for reprocessing and extraction of the resulting plutonium. Also, if a leak occurs in the jacket of a slug, said slug has to be unloaded.

A nuclear reactor of the gas-cooled, solid moderated type is disclosed in the U.S. Patent No. 2,708,656 issued to Fermi and Szilard on May 17, 1955, especially with reference to FIGS. 31 to 36 thereof. In the reactor disclosed in said patent, the channels in the graphite block are horizontally disposed according to a geometric pattern between a front inlet face and an end outlet face of the moderator block and the new slugs are loaded by being pushed through the inlet face inside each channel by a plunger, whereas they are unloaded by the same plunger which acts either directly on the "spent" slugs or on new slugs which are loaded and push in front of them the spent slugs. In both cases, the spent slugs, once they are pushed out of their channel through the outlet face, fall into an outlet chamber comprised between the end outlet face of the moderator block and the front face of a vertical rear shield. As the height of fall is very important, especially for the superior channels, pad plates are provided at the bottom of said chamber for cushioning the fall of the slugs and for directing them towards a vertical outlet pipe which is located at the center bottom of said chamber and brings the slugs to a car carrying a series of coffins for receiving said slugs, said car being movable on tracks in a tunnel located under said outlet chamber and suitable valves isolating the outlet chamber from the tunnel when no slugs are unloaded.

Although special padding materials are used, damages may occur to the unloaded slugs and in particular to the jackets thereof, either at their first fall on the pad plates, or after the rebounding thereof on said plates, especially when said jackets are provided with cooling fins (as it is generally the case) and/or when the jackets were distorted by their residence in the reactor. Furthermore, the rate of unloading is limited by the rebounding time and the reactor has to be shut down for a certain period before it is possible to unload the spent fuel.

The invention has therefore for an object to provide an unloading device for nuclear reactors which is free from the above-mentioned drawbacks.

It is another object of the invention to provide an unloading device which allows to perform the unloading of the hot spent or burst slugs from a nuclear reactor without shutting down said reactor, the slugs being partially cooled during the unloading operation.

It is still an object of the invention to provide means for performing a completely safe and automatic unloading of the spent or burst slugs from a nuclear reactor, without any danger for the personnel.

For this purpose, according to my invention, I provide—for a nuclear reactor including a block of solid moderator pierced, between a vertical inlet face and an outlet face parallel to said inlet face, by a plurality of horizontal channels extending therethrough and ending along said outlet face by discharge ends forming at least one series of parallel oblique rows, said channels containing slugs of fissionable material and being traversed by coolant gas flows, with a shield surrounding said block and means for pushing said slugs out of said channels through said discharge ends—a device for evacuating the pushed slugs out of said shield including a plurality of parallel inclined chutes running along said outlet face of the moderator block, each of said chutes passing slightly below, and parallel to, an oblique row of channel discharge end of said series, a plurality of curved guiding elements for connecting said discharge ends disposed along such an oblique row with different points of the chute passing slightly below said row, and further chute means extending through said shield and connecting the lower ends of said inclined chutes with the outside of said shield, the slope of said inclined chutes of said curved guiding means and of said further chute means being sufficient for allowing a free gliding thereon of said pushed slugs by mere gravity.

Preferably, said further chute means include a helical chute of a type known per se having a vertical axis and two different points of which the lower ends of said inclined chutes are connected, preferably through curved junction elements having a slope inferior to the slope of said chutes, said helical chute being preferably located inside said shield and having its bottom end connected to a single inclined chute conduit traversing said shield and ending outside said shield.

Preferred embodiments of my invention will be hereinafter described with reference to the accompanying drawings given merely by way of example and wherein:

FIG. 2 illustrates a plan view of the same reactor, the portion of the peripheral shield above the plane II—II of FIG. 1 having been removed.

FIG. 3 is a sectional view, along plane III—III of FIG. 1, showing the helical chute included in said further chute means.

FIG. 4 shows, in a similar section, a modification of the helical chute.

FIG. 5 is a perspective view showing the curved guiding elements connecting the discharge ends of the channels in the moderator block with one inclined chute running along the outlet face of said block.

FIG. 6 is a sectional view, along plane VI—VI of FIG. 5, showing the securing of such a guiding element on said moderator block.

FIG. 12 shows an unloading device according to a third embodiment of the invention.

Figure 1:
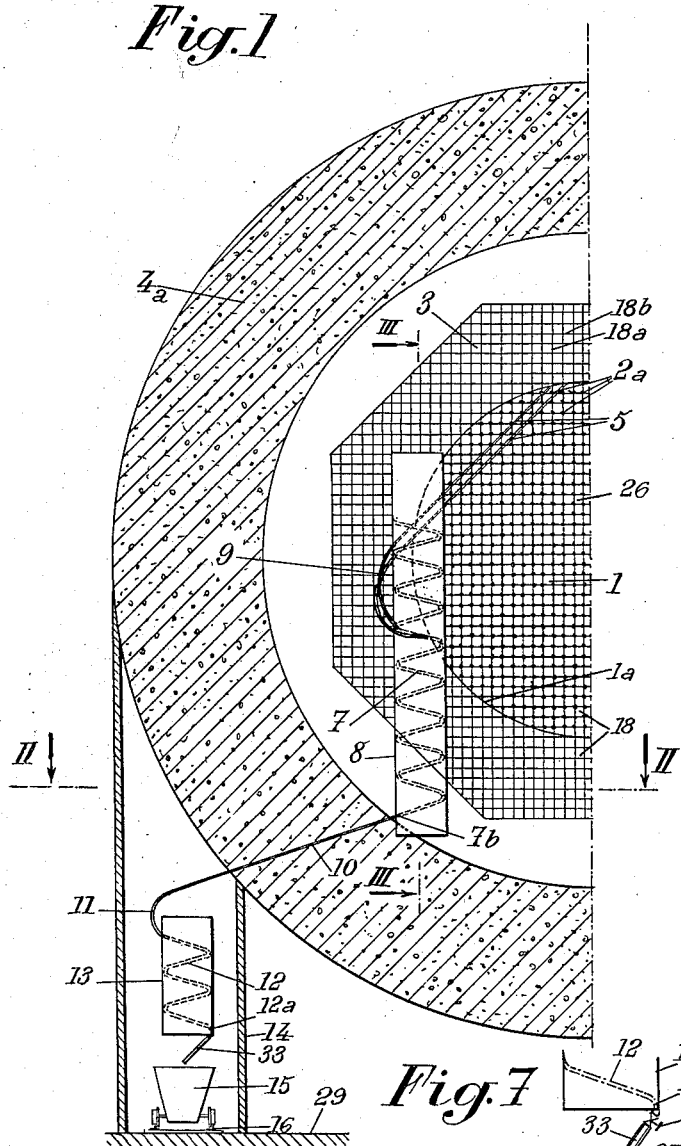
FIG. 1 is an end view of one half of a gas-cooled solid-moderated nuclear reactor enclosed in a cylindrical shield and provided with a slug unloading device according to the invention, the end or outlet portion of the shield being omitted in this view.
Figure 8:
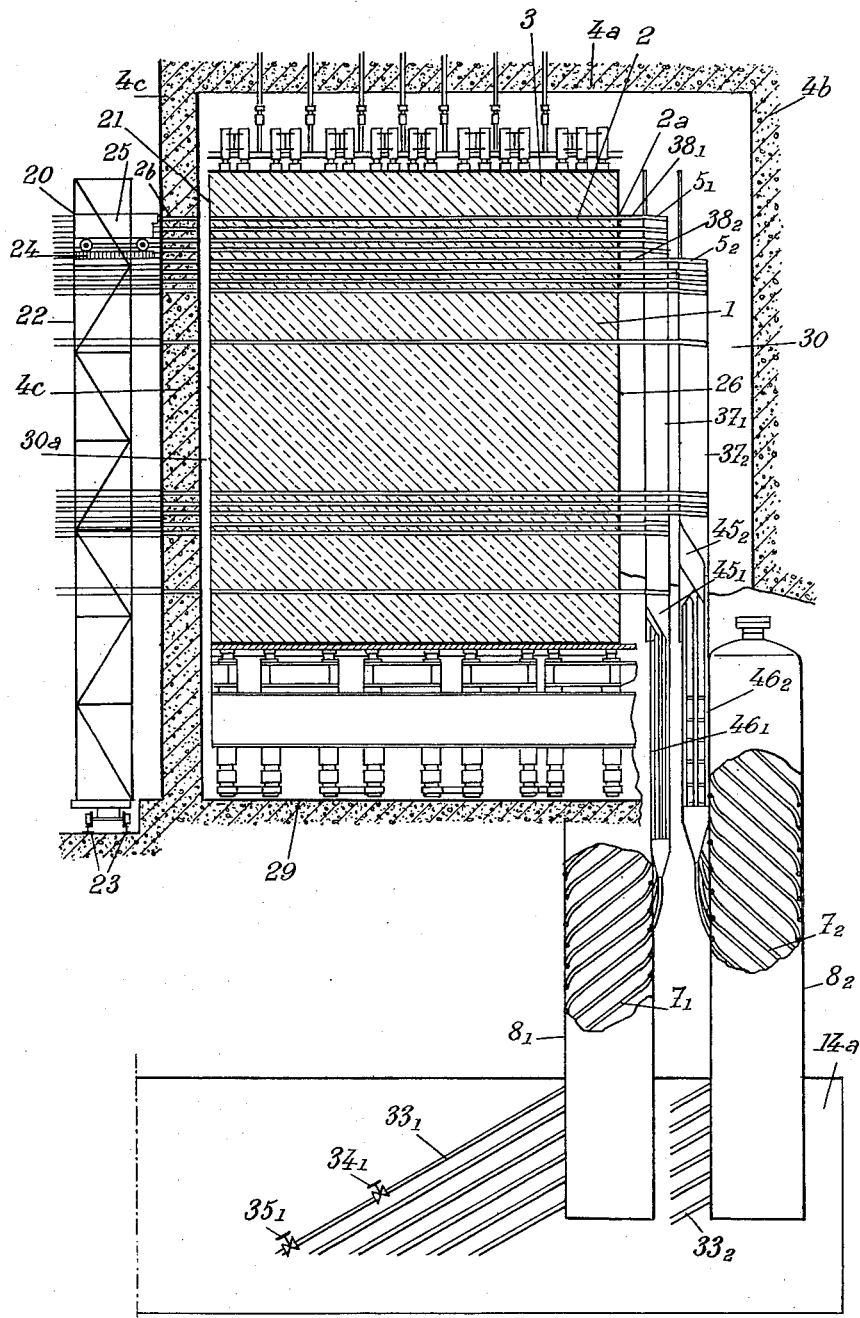
FIG. 8 is a longitudinal section through a gas-cooled solid-moderated nuclear reactor having conventional loading means and an unloading device according to a second embodiment of the invention.

Referring now to the drawings, the slug evacuation or unloading device according to the invention is adaptable to a nuclear reactor of the gas-cooled, solid-moderated type, disclosed in the above-mentioned patent and shown in FIGS. 1, 2 and 8. Such a reactor comprises essentially a block of solid moderator, as graphite, including a central active portion 1, delimited by peripheral surface 1a and wherein the useful nuclear fission reaction takes place, and a peripheral reflector portion 3 for reducing the loss of neutrons produced by the nuclear fission reaction. Said block 1, 3 is generally constituted, as shown on FIG. 1, by a series of piled horizontal bars or prisms 18 (most of rectangular cross section) realized in the moderator substance.

Figure 9:
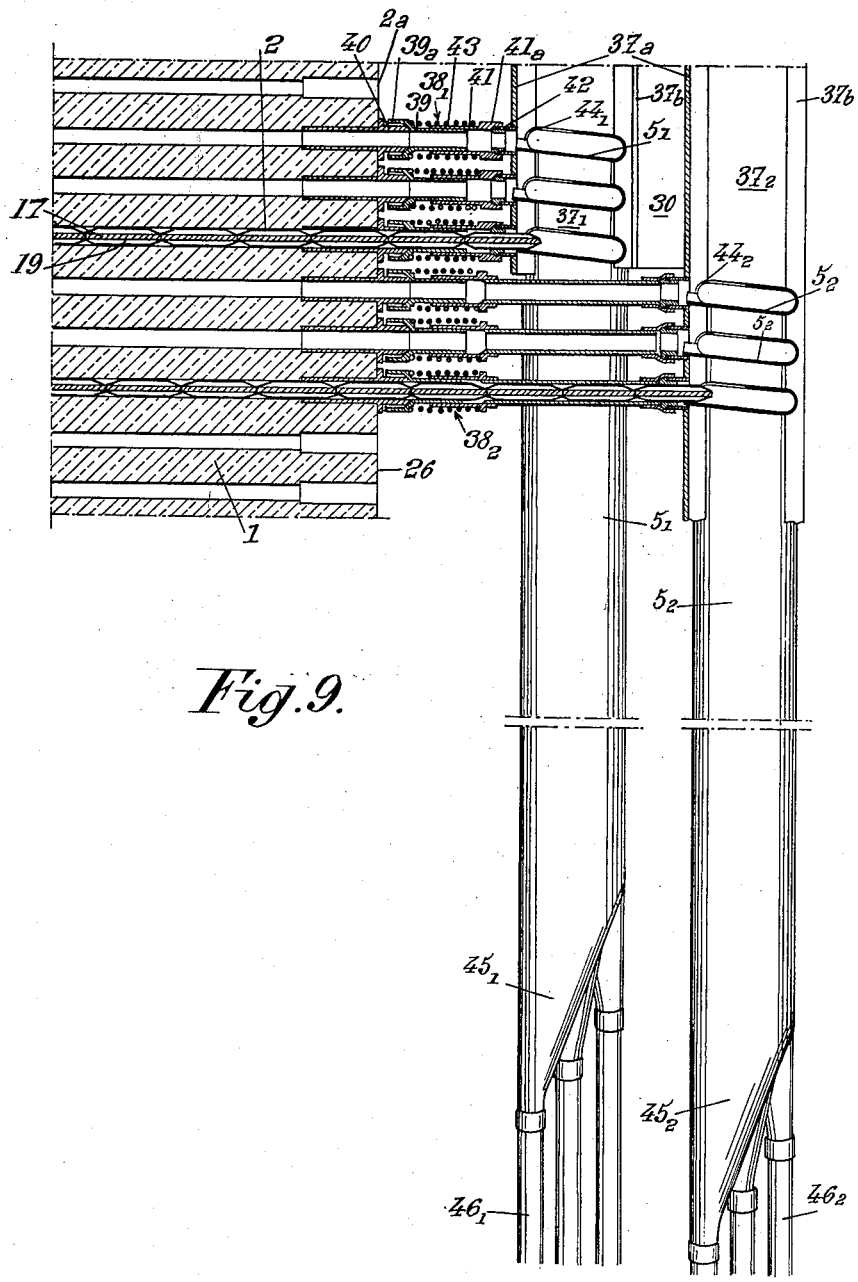
FIG. 9 is an enlarged view of a portion of FIG. 8 corresponding to the discharge ends of some of the channels in the moderator block and to the associated inclined parallel chutes.

The active portion 1 is pierced by very many (about one thousand) horizontal channels 2 arranged according to a geometrical pattern, e.g. along parallel rows of superposed horizontal lines. In said channels are located sheathed slugs 17 (shown on FIG. 9) of fissionable material (e.g. of natural uranium and having 300 mm. long and 26 mm. diameter and surrounded by an aluminum alloy sheath) and wherethrough are circulated coolant gas flows (e.g. of carbon dioxide under a pressure of about 210 p.s.i.), the slugs 17 being therefore provided with cooling fins 19 (FIG. 9).

For sake of clarity, the outlet or discharge ends 2a of the channels 2 were illustrated by black dots on FIG. 1 at the intersection of the vertical and horizontal lines (respectively 18a and 18b) delimiting the different horizontal bars or prisms 18 of graphite constituting the graphite block; whereas on FIG. 2, only two of these channels 2 are shown in dotted lines. For example the channels 2 may have a diameter of 70 mm. and their lines may be regularly spaced of 200 mm.

The whole graphite block 1, 3 is located inside a shield, for instance in concrete, including a peripheral portion 4a, a rear or end portion 4b and a front portion 4c.

The slugs 17 of fissionable material are loaded in the channels 2, as in the afore-mentioned patent, by a loading mechanism 20, well known in the art and which is no part of the present invention. This mechanism, which is adapted to push new fuel slugs in any channel 2 through an extension tube 2b provided in the front portion 4c of the shield and the vertical inlet face 21 of the graphite block, comprises essentially (as shown on FIG. 8) an elevator structure 22 movable on tracks 23 and including a platform 24, adapted to be raised or lowered, and a truck 25 carried by said platform and provided with (not shown) containers for transporting new slugs and with means for driving said slugs out of said containers and for pushing them inside said channels, a lock chamber with hermetic shut-off gates being provided in the known manner for preventing the escape of coolant gas from the channel which is loaded.

Whereas the loading mechanism 20 is conventional, the illustrated unloading or transportation device is made according to the invention and it permits the safe and automatic unloading of the spent or irradiated slugs, without any danger for the personnel and the cooling of the slugs, even when the reactor is in operation, by merely passing the slug (or slugs) to be unloaded from a given channel, through the outlet face 26 by the introduction in said given channel either of a new slug (or new slugs) or of a plunger by means of said loading mechanism, thereby pushing out of the channel the slug (or slugs), which is (or are) in the vicinity of the discharge end 2a of said given channel.

Figure 7:
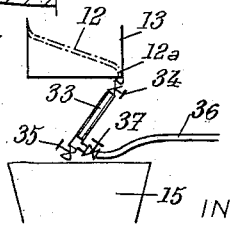
FIG. 7 shows, at an enlarged scale, a detail of a modification of the unloading device according to FIGS. 1 and 2, i.e. of the lower end of said further chute means.

In a first embodiment illustrated in FIGS. 1 to 7 (FIGS. 4 and 7 showing slight modifications of this embodiment), the static unloading device according to the invention and adapted to cooperate with a gas-cooled solid-moderated nuclear reactor having horizontal channels 2 and conventional loading means 20, comprises essentially a plurality of inclined parallel chutes 5, which are for instance gutter-shaped chutes made in structural/low-carbon steel or stainless steel at least 2 mm. thick running along the outlet face 26 of the moderator block into which the channels 2 open at their discharge ends 2a. Only two of said chutes 5 are shown in FIG. 1 and only one chute 5 is shown on FIG. 1 for sake of clarity. Each chute 5 passes slightly below, and parallel to, an oblique row of discharge ends 2a of the channels 2, the slope of chutes 5 being sufficient for allowing the slugs to slide freely along the chutes by mere gravity.

For example, when using an aluminum, aluminum-magnesium or aluminum-zirconium jacket and an ordinary structural steel or stainless steel chute, the chutes may form an angle of 45° to the horizontal, but of course any angle lower than about 75° and the lowest angle with the horizontal allowing a safe free sliding of the slugs on the chutes may be used for example an angle between 27 and 75° for the above-mentioned materials. Of course, due to the geometric patern of the channels, only discrete values of slopes can be used (e.g. equal to $n/m$, with $n$ and $m$ small integers, for the arrangement along horizontal and vertical lines of the discharge end 2a illustrated on FIG. 1).

All the discharge ends 2a of the channels 2 of such an oblique row (e.g. at 45°) are connected with the corresponding chute 5 through a plurality of respectively curved and inclined guiding surfaces or elements 6 (as shown on FIG. 5), the shape of said elements 6 being of course dependent on the length and the diameter (or other transversal dimension) of the slugs (shown at $17_1$, $17_2$, $17_3$).

In the embodiment illustrated on FIG. 5, the guiding elements 6 (e.g. in structural steel) for each channel comprises a gutter-shaped portion 6a and the assembly of all said portions 6a for an oblique row of channel ends 2a, form (as shown) the corresponding chute 5.

As shown on FIG. 6, each guiding element or surface 6 comprises a bent flange 6b allowing to secure said surface on the outlet face 26 of the graphite block, for example by means of bolts 27; further, the gutter-shaped portions 6a constituting the chutes 5 may be supported by racks 28 carried by the floor 29 of the reactor as explained hereinafter with reference to the second embodiment.

In the first embodiment, the static unloading device further includes a helical chute 7 which is constituted (as shown on FIG. 3) by a curved steel angle very slightly depressed in V in the bottom portion, and is arranged along the inside wall 29 of a circular cylinder 8 with vertical axis located inside shield 4a, 4b, 4c as shown in FIG. 1. In a modification shown on FIG. 4 the helical chute (of same cross-section, but inverted), designated 7a, may extend along the outside wall 29b of a circular cylinder 8a of vertical axis.

The lower end of every inclined chute 5 is joined to the helical chute 7 (or 7a) through a connecting surface or conduit 9 having for an object to slow down the gliding movement of the slugs arriving by the corresponding chute 5. Therefore, the shape and slope of these connecting conduits is determined for obtaining a suitable speed of the slugs when they reach helical chute 7. For example they may form a mean angle of about 27° with the horizontal. The pitch of the helical chute 7 (or 7a) is also determined to obtain a suitable speed of the slugs at the lowest end thereof and therefore a suitable time of travel of the slugs between the discharge ends 2a of channels 2 and the lower extremity 7b of chute 7 corresponding to the passage of shield portion 4a. For example, a suitable limit speed of about 7 feet per second may be obtained in a steel helical chute having a slope of 0.511 and enclosed in a tower having a diameter of about 6 feet and a height of about 60 feet; the slowing down is also realized by the friction of the slugs against the depressed bottom portion of helical chute 7 (or 7a) and the external peripheral wall 29 (or 29a, FIG. 4) of the cylinder or chute, against which is applied the slug by the centrifugal force during the descent. The cylinder or tower 8 may be realized in steel sheet sufficiently thick to support the pressure inside the reactor or in concrete (e.g. in concrete 5 feet thick).

In fact, the tower 8 and the multiplicity of inclined chutes 5, each with its guiding surface 6 and connecting conduit 9, are located in the cylindrical chamber 30 (FIG. 2) limited by the two parallel surfaces 26 of the outlet face of the graphite block 1, 3 and 31 of the end or rear shield portion 4b and by the internal surface 32 of the peripheral shield portion 4a, the coolant fluid (e.g. carbon dioxide at a pressure of 210 p.s.i.) circulating freely in said chamber 30 between said chutes 5 for reaching the discharge ends 2a when the coolant is circulated from the outlet face towards the inlet face through the channels by blower means not shown which recycle it from the front chamber 30a. In a modification (as shown for the second embodiment on FIGS. 8 to 11) the chutes 5 may be located in one or several flat vertical boxes through which is circulated the coolant fluid. In both cases, the distance between the outlet face 26 of the graphite block and the internal surface 31 of the end shield is large (as in the above-mentioned patent) and it may here allow an easy flow of the coolant gas all through the many chutes which are located therein.

The bottom end 7b of helical chute 7 is connected to a rectilinear inclined conduit 10 which extends through the end and peripheral portions 4a, 4b, for example as shown, and communicates, through a guiding tube 11 (which, as guiding conduit 9, has for an object to slow down the discharged slugs), with the top of a further helical chute 12 located inside a cylinder 13. The slope of conduit 10 is preferably chosen as low as possible (e.g. of about 27° with the horizontal) for reducing the vertical distance between helical chutes 7 and 12, the pitch and diameter of the helical chute 12 being for example equal respectively to the pitch and diameter of helical chute 7.

The whole of guiding tube 11, helical chute 12 (similar to chute 7) and cylinder 13 (similar to cylinder 8) is located in a chamber 14 (e.g. with 5 feet thick concrete walls) adapted to support the pressure existing inside the shield and located e.g. on the floor supporting the reactor.

In said chamber 14 are provided means for receiving the spent or burst slugs arriving at the extension 33 of the lower end 12a of helical chute 12, for example a car 15 movable on a track 16 and carrying a shock-absorbing material, such as sand, or a device for enclosing in suitable containers the irradiated slugs. A conventional not shown lock-chamber closed by two hermetic shut-off gates is provided between chamber 14 and the outside for permitting the passage of cars 15 to and from this chamber without substantial loss of radio-active coolant gas.

In a modification, shown on FIG. 7, to the lock-chamber could be substituted valves 34 and 35 at both ends of extension 33 which communicates, through a single hole in fluid-tight cylinder 13, with the lower end 12a of chute 12 and has a length slightly superior to the length of the slugs 17, a duct 36, controlled by a valve 37, allowing to evacuate from extension 33 the coolant gas under pressure.

The described unloading device operates as follows:

An irradiated uranium slug 17 pushed out of a given channel 2 of the reactor, e.g. by the introduction of a new slug in said channel 2 by means of the loading mechanism 20, leaves the graphite block portion 1 through the discharge end 2a of said channel 2. It slides along the guiding surface 6 which produces a rotation thereof of about 90°, as shown on FIG. 5 by three particular successive positions $17_1$, $17_2$, $17_3$ in dotted lines of an evacuated slug; said slug reaches the inclined chute 5 corresponding to said channel and it slides along said chute 5 before being slowed down by passing along the connecting conduit 9 in the higher section of helical chute 7 until it reaches its limit speed for the slope of the chute 7 (e.g. 7 feet/sec.); the slug travels then in the lower section of helical chute 7 at a uniform speed (e.g. 7 feet/sec.) until it reaches the inclined tube 10. The speed of the slug slightly increases along said tube, but is slowed down in the curved connecting tube 11 and in helical chute 12. It finally drops gently onto the sand contained in car 15 (FIG. 1) which can be moved out of chamber 14 along track 16, through the aforementioned not shown lock-chamber, when it has received a certain number of slugs.

In the modification of FIG. 7, valve 34 is normally open and valves 35 and 37 are normally closed, so that a discharged slug reaches extension 33. Then the valve 34 is closed and valve 36 opened for evacuating substantially all coolant fluid from extension 33 through duct 36 connected to a (not shown) gas pump. After closing valve 36, valve 35 is opened and the slug falls gently onto the sand in car 15.

Figure 11:
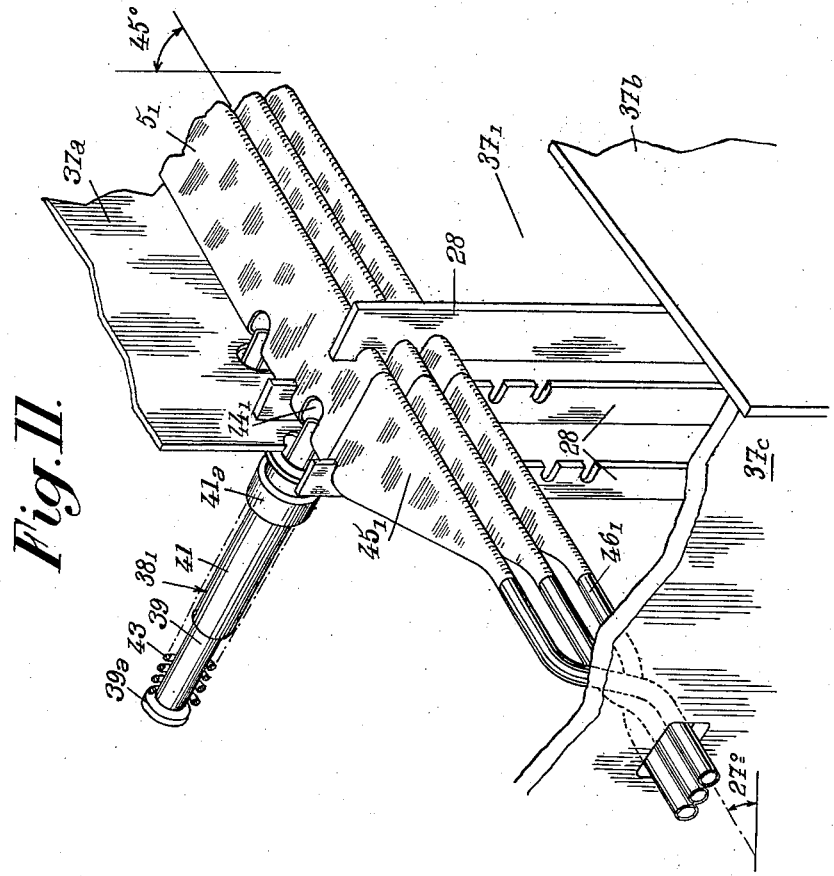
FIG. 11 is an isometric projection of the attachment of said inclined chutes in the position shown in FIG. 10.

In a further embodiment of the invention shown on FIGS. 8 to 11, the chutes are divided in two (or several) groups $5_1$, $5_2$ and each group of chutes is located in a vertical flat box $37_1$, $37_2$ (used for bringing the coolant gas, as carbon dioxide, under pressure to the discharge ends 2a of channels 2) and leads to a separate tower or cylinder $8_1$, $8_2$ similar to cylinder 8 of the first embodiment. Further other constructive differences exist between the embodiment of FIGS. 8 to 11 and the embodiment of FIGS. 1 to 3 and 4 to 6 i.e.:

A connecting conduit $38_1$, $38_2$ is provided between each channel 2 and the corresponding inclined chute $5_1$, $5_2$; more precisely, as shown on FIGS. 9 and 11, each conduit $38_1$, $38_2$ comprises a first tubular portion 39, slightly rotatable on a duct 40 extending each channel 2, and a second tubular portion 41, slightly rotatable on a duct 42 traversing the front wall 37a of the corresponding box $37_1$, $37_2$, the second tubular portion 41 being slidably mounted on said first tubular portion 39 and a spring 43 being compressed between a collar 39a carried by said first portion and a collar 41a carried by said second portion, so that the rotating and sliding movements allow a relative displacement between the graphite block 1, 3 and the boxes $37_1$, $37_2$ when the temperature of the block and of the boxes, and therefore the dimensions of these elements vary;

The inclined chutes $5_1$ (or $5_2$) are constituted by flat tubes comprising an opening $44_1$ (or $44_2$) in front of the rear end of the connecting conduits $38_1$ (or $38_2$), said opening allowing the entrance of the coolant gas from the box $37_1$ (or $37_2$) in the corresponding channel 2;

The chutes $5_1$ (or $5_2$) are supported by racks 28 secured (e.g. welded) on the lateral walls 37a, 37b of the box $37_1$ (or $37_2$);

The connection between the helical chutes $7_1$, $7_2$ inside towers $8_1$, $8_2$ is performed by providing a conduit $45_1$, $45_2$ having the shape of a flat funnel at the lower end of each chute $5_1$, $5_2$ and by extending each portion $45_1$, $45_2$ by a tube $46_1$, $46_2$ having a smaller slope than chutes $5_1$, $5_2$ (e.g. a slope of 27°, instead of 45° for the chutes with the horizontal) and traversing lateral walls 37c of boxes $37_1$, $37_2$ and the tubes $46_1$ are connected to helical chutes $7_1$ and the tubes $46_2$ with helical chutes $7_2$;

Each tower or cylinder $8_1$, $8_2$ includes several (e.g. six) helical chutes $7_1$, $7_2$ which are "parallelly" arranged (as the six threads of a six-thread screw) and are extended by straight inclined portions $33_1$, $33_2$ in a lower chamber $14a$ wherein is provided a spent slug conditioning and/or transportation system (e.g. a car on a track as in the first embodiment) which is no part of the invention, a conventional lock chamber being provided between said chamber $14a$ and the exterior. In a modification, valves, as shown at $34_1$ and $35_1$ for one inclined portion or extension $33_1$ may be provided for isolating (as in the modification of FIG. 7) the unloading chutes from the exterior.

The automatic operation of the unloading device according to the embodiment shown in FIGS. 8 to 11 is similar to the operation of the device according to the first embodiment, except that the slugs 17 are recovered at the bottom of towers $8_1$, $8_2$ in a chamber $14a$ wherein end the inclined portions $33_1$, $33_2$ extending the several chutes $7_1$, $7_2$ (e.g. six chutes as shown) of each tower.

It should be noticed that in both embodiments the irradiated and hot slugs are cooled down (or at least their tendency to heat is reduced) during their descent due to the coolant fluid which is in contact therewith or with the runways, as the chutes 5, leading said slugs. This is particularly true when the coolant gas sweeps the channels 2 from the outlet face towards the inlet face, i.e. when the cold gas arrives in said channels between the outlet face 26 and the end shield $4b$ either freely in chamber 30, as in the first embodiment, or through vertical boxes $37_1$, $37_2$ as in the second embodiment.

Figure 10:
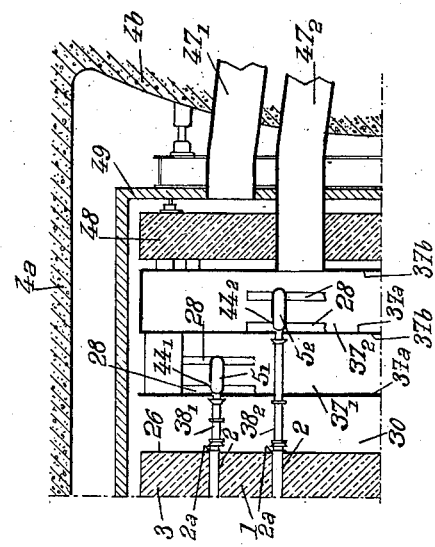
FIG. 10 shows, in a partial longitudinal section of the reactor of FIG. 8, the location of said inclined chutes between the outlet face of the moderator block and the rear portion of the shield in this second embodiment.

On FIG. 10 is shown the arrival of the coolant gas (e.g. under a pressure slightly above 210 p.s.i.) through ducts $47_1$ and $47_2$ respectively to boxes $37_1$ and $37_2$. For example, as shown, the box $37_2$ may be fluid tight, whereas box $37_1$ may freely communicate with the chamber 30 in which ends duct $47_1$, said chamber 30 further comprising a vertical wall 48 in graphite, constituting a rear reflector for the neutrons. Further on FIG. 10, is illustrated a conventional thermal shield 49 in steel between the graphite block 1, 3 and the thermal shield in concrete, said thermal shield being omitted in the previous figures.

In the embodiment of FIGS. 8 to 11 the coolant system is divided in two separate sections, e.g. one section corresponding to the central zone of the active moderator portion 1 and another section corresponding to the peripheral zone of this portion 1, thereby allowing a different cooling in said sections, and the slugs from each section are unloaded, by separate means, i.e. respectively elements $38_1$, $5_1$, $45_1$, $46_1$, $7_1$, $33_1$ on the one hand, and $38_2$, $5_2$, $45_2$, $46_2$, $7_2$, $33_2$, on the other hand.

Although in the preferred forms of my invention illustrated on FIGS. 1 to 7 and 8 to 11, the helical chute 7 (or $7a$) or chutes $7_1$, $7_2$ are located inside shield 4, they might be located outside said shield. Such an arrangement is shown on FIG. 12 schematically illustrating an unloading device according to a third embodiment of the invention.

On FIG. 12, parallel inclined chutes 5 run along the outlet face 26 of the block of graphite 1, 3, said chutes being realized and secured on said block as disclosed for the first embodiment of FIGS. 1 to 7. For reducing the number of openings in the thermal shield 49 (in steel) and in the peripheral portion $4a$ of the concrete or biological shield, the several chutes 5 are grouped $p$ by $p$ (e.g. three by three as illustrated), the chutes 5 of each group ending in a funnel piece 50 having an inferior portion extended by an inclined tube $5c$ making an angle of about 27° with the horizontal (whereas chutes 5 make an angle of 45°). Tubes $5c$ traverse shields 49 and $4a$ and are connected to helical chutes $7c$ similar to chutes $7_1$ and $7_2$ carried by a cylinder or tower $8c$ similar to towers $8_1$ and $8_2$, but located outside the biological shield. The six chutes $7c$ are extended by six rectilinear portions $33c$ which are located in a chamber $14c$ similar to chamber $14a$ and provided with spent slug conditioning and/or transportation means, preferably of the completely automatic operating type as in the other embodiments.

The unloading device, according to FIG. 12, operates as the unloading devices according to the first and second embodiments.

In all embodiments of my invention, the unloading device is adapted to cooperate with a gas-cooled solid-moderated nuclear reactor. Such reactors are well known in the art and were constructed: at Chicago (CP1, re-built as CP2 at Argonne), Oak Ridge (Clinton reactor), and Brookhaven (Brookhaven graphite research reactor) in the United States, at Harwell (Gleep and Bepo), Windscale and Calder Hall in Great Britain, at Marcoule (G1) in France, either of the atmospheric pressure type or of the over atmospheric pressure type.

The chutes (and the other runway elements), having only to withstand radioactivity and abrasion during a very short duration for each unloaded slug, may be realized in conventional structural steel or stainless steel, or in any other metal used for realizing the jackets of the slugs (e.g. an aluminum alloy). The minimum thickness of the chutes (and the other elements of the runways) is different if said chutes have only for an object to permit the gliding of the slugs or if they have also to assist in sustaining the reactor portions: e.g. for steel chutes, a thickness of about 2 mm. is sufficient due to the low abrasion in the first case, but steel sheet up to 15 mm. thick could be used in the second case.

The chutes may be secured either directly to the outlet face of the moderator block (as shown on FIG. 6), or in the same manner as illustrated on FIG. 6, to the metallic end plate with which some nuclear reactors are provided against the outlet face of their moderator block, such a plate comprising openings in front of the discharge ends of the channels, or by racks located in flat boxes (FIGS. 10 and 11). In all cases, the passage afforded to the cooling gas between and/or through the chutes should have a minimum cross section superior to the total cross section of the channels. It is always possible to satisfy such a condition by providing a rear chamber 30 of sufficient volume behind the outlet face of the moderator block and in the second embodiment, sufficiently large boxes for locating the chutes. Furthermore, in some embodiments, the coolant gas may pass through a portion or the totality of the chutes and other runway elements, thereby increasing the passage section and improving the cooling of the hot slugs which are unloaded.

The spacing of the inclined chutes, as 5, depends on the spacing of the channels 2 and on the chosen slope for the chutes e.g. for the regular pattern of the channels shown in the figures (especially in FIG. 1) and for a spacing D between the axes of two adjacent (horizontal or vertical) channels, the spacing $d$ between the axes of two adjacent inclined chutes 5 is given by the formula $$d = D/\sqrt{2}$$

Therefore when $D=200$ mm., as in the example indicated hereinabove, $d=142$ mm.

An unloading device according to the invention takes advantage of the geometric arrangement of the channels of a reactor for grouping said channels into oblique rows and having a single chute as 5, for each of said rows; the number of runways "in parallel" is progressively reduced until a single or a few discharge ends as 33.

Such a device allows a safe and automatic unloading without shutting-down the reactor. It is therefore possible, in normal operation, to discharge by thirds the slugs of each channel so that each slug has a same irradiation due to successive residences in the front portion, in the central portion or heart, and in the rear portion of the channel, without undue shutting-downs as would be the case with prior art unloading devices. It also allows an accelerated unloading of the slugs in case of an accident (e.g. when a jacket failure was detected).

As concerns the slopes of the various portions of the runways, indications were given hereinabove, but it is always useful to erect a true-scale model of such runways and to deliver a great number of fresh slugs at the upper extremity thereof so as to verify the correct operation thereof, because, once the reactor is in operation, any modification of the runways demands very complicated measures.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

The present application is a continuation-in-part of my prior patent application Ser. No. 593,213, filed June 22, 1956, for "Improvements in Devices for Removing Fissionable Material Rods From Nuclear Reactors," now abandoned.

What I claim is:

1. In combination with a nuclear reactor of the type including: a block of solid moderator having a front vertical face and a rear vertical face parallel to said front face; a plurality of horizontal channels traversing said block, between inlet extremities located in said front face and discharge extremities located in said rear face, according to a regular geometric pattern, with said discharge extremities forming at least one plurality of parallel inclined rows; radioactive rods of fissionable material located inside said channels; at least one cooling system for circulating a cooling gas flow through said channels along said rods; at least one shield located around said block; and a loading device for inserting fresh rods of fissionable material in said channels through said inlet extremities and expelling radioactive rods out of said channels through said discharge extremities; a device, for the safe automatic transportation, under cooling conditions and while maintaining said nuclear reactor in operation, of said expelled radioactive rods from said discharge extremities to at least one discharge location outside said at least one shield, comprising: at least one flat box disposed substantially parallelly to, and in the vicinity of, said rear face; means for supporting, in said at least one box, a plurality of guiding chutes according to a series of inclined planes disposed each slightly below and parallel to an inclined corresponding row of said discharge extremities in said rear face, each of said guiding chutes comprising an upper portion with at least one aperture and a lower end, said upper portion of each of said guiding chutes being constituted by a flattened tube of substantially oval cross-section, the major axis of said oval cross-section being substantially horizontal, whereas said lower end of each of said guiding chutes is constituted by a funnel-shaped section having an upper extremity of substantially oval cross-section identical to the cross-section of and connected to said upper portion and a lower extremity of circular cross-section, the radius of said circular cross-section being substantially equal to the minor axis of said oval cross-section; at least one plurality of substantially horizontal connecting conduits extending said channels, each of said connecting conduits having a first end inserted in one of said channels through the discharge extremity thereof and a second end traversing said at least one box and an aperture in the guiding chute from said plurality of guiding chutes located in the traversed box and passing slightly below the corresponding inclined row of discharge extremities; means, in said cooling system, for passing at least part of said cooling gas flow, through said at least one box, the apertures in said guiding chutes, said guiding chutes and said connecting conduits, towards said channels; and further chute means traversing said at least one shield through a reduced number of passages and connecting said lower end of said guiding chutes with said at least one discharge location.

2. In combination with a nuclear reactor of the type including: a block of solid moderator having a front vertical face and a rear vertical face parallel to said front face; a plurality of horizontal channels traversing said block, between inlet extremities located in said front face and discharge extremities located in said rear face, according to a regular geometric pattern, with said discharge extremities forming at least one plurality of parallel inclined rows; radioactive rods of fissionable material located inside said channels; at least one cooling system for circulating a cooling gas flow through said channels along said rods; at least one shield located around said block; and a loading device for inserting fresh rods of fissionable material in said channels through said inlet extremities and expelling radioactive rods out of said channels through said discharge extremities; a device, for the safe automatic transportation, under cooling conditions and while maintaining said nuclear reactor in operation, of said expelled radioactive rods from said discharge extremities to at least one discharge location outside said at least one shield, comprising: at least one flat box disposed substantially parallelly to, and in the vicinity of, said rear face; means for supporting, in said at least one box, a plurality of guiding chutes according to a series of inclined planes disposed each slightly below and parallel to an inclined corresponding row of said discharge extremities in said rear face, each of said guiding chutes comprising an upper portion with a least one aperture and a lower end; at least one plurality of substantially horizontal connecting conduits extending said channels, each of said connecting conduits being constituted by a first tubular portion, having one end thereof inserted in one of said channels through the discharge extremity thereof and provided with a first flange outside and in the vicinity of said extremity, and another free end, by a second tubular portion having a first end, with an inner cross-section substantially equal to the external cross-section of said other end of said first portion and freely sliding around said other end, and a second end, traversing said at least one box and an aperture in the guiding chute from said plurality of guiding chutes located in the traversed box and passing slightly below the corresponding inclined row of discharge extremities and carrying a second flange outside and in the vicinity of said box, and by a spring located around said first and second tubular portions between said first and second flanges, for biasing said first portion against the discharge extremity of the respective channel and the second portion against said box; means, in said cooling system, for passing at least part of said cooling gas flow, through said at least one box, the apertures in said guiding chutes, said guiding chutes and said connecting conduits, towards said channels; and further chute means traversing said at least one shield through a reduced number of passages and connecting said lower end of said guiding chutes with said at least one discharge location.

3. A device according to claim 2, wherein said second portion of each conduit is constituted by two elements mounted for relative pivoting movement therebetween.

References Cited in the file of this patent
FOREIGN PATENTS

| | | |
|---|---|---|
| 1,129,103 | France | Jan. 16, 1957 |
| 787,971 | Great Britain | Dec. 18, 1957 |